United States Patent
Goldman et al.

(10) Patent No.: US 6,766,283 B1
(45) Date of Patent: Jul. 20, 2004

(54) SYSTEM AND METHOD FOR MONITORING PROCESS QUALITY CONTROL

(75) Inventors: Arnold J. Goldman, Jerusalem (IL); Jehuda Hartman, Rehovot (IL); Joseph Fisher, Jerusalem (IL); Shlomo Sarel, Ma'aleh Michmash (IL)

(73) Assignee: Insyst Ltd., Jerusalem (IL)

( * ) Notice: Subject to any disclaimer, the term of this patent is extended or adjusted under 35 U.S.C. 154(b) by 671 days.

(21) Appl. No.: 09/689,884

(22) Filed: Oct. 13, 2000

(51) Int. Cl.[7] .................................. G06F 17/10
(52) U.S. Cl. ..................... 703/2; 700/108; 700/121
(58) Field of Search .................... 703/2; 700/108, 700/109, 110, 121; 706/16

(56) References Cited

U.S. PATENT DOCUMENTS

| | | | |
|---|---|---|---|
| 4,970,658 A | 11/1990 | Durbin et al. | |
| 5,325,466 A | 6/1994 | Kornacker | |
| 5,440,478 A | 8/1995 | Fisher et al. | |
| 5,479,340 A | 12/1995 | Fox et al. | |
| 5,483,468 A | 1/1996 | Chen et al. | |
| 5,546,507 A | 8/1996 | Staub | |
| 5,711,843 A * | 1/1998 | Jahns | 156/345.24 |
| 5,751,582 A * | 5/1998 | Saxena et al. | 700/109 |
| 5,787,425 A | 7/1998 | Bigus | |
| 5,862,054 A | 1/1999 | Li | |
| 5,875,285 A | 2/1999 | Chang | |
| 6,032,146 A | 2/2000 | Chadha et al. | |
| 6,073,138 A | 6/2000 | de l'Etraz et al. | |
| 6,087,613 A * | 7/2000 | Buda et al. | 219/110 |
| 6,115,701 A * | 9/2000 | Thaler | 706/16 |
| 6,134,555 A | 10/2000 | Chadha et al. | |
| 6,240,329 B1 | 5/2001 | Sun | |
| 6,249,712 B1 | 6/2001 | Boiquaye | |
| 6,263,255 B1 | 7/2001 | Tan et al. | |

FOREIGN PATENT DOCUMENTS

WO    WO 00/00874    1/2000

OTHER PUBLICATIONS

Paul I. Meyer, Introductory Probability and Statistical Applications, 1965, Addison Wesley, pp. 108–110.*

Dixon & Massey, Introduction to Statistical Analysis, 1969, McGraw–Hill, p. 136.*

Triant Our Products http://www.triant.com/top.html [10 pages].

Artificial Intelligence and Manufacturing: A Research Planning Report, Leslie D. Interrante Aug. 8. 1997, http://sigmans.cs.umn.edu/sigmanwrk/report96.htm [34 pages].

(List continued on next page.)

Primary Examiner—Albert W. Paladini
(74) Attorney, Agent, or Firm—G. E. Ehrlich (1995) Ltd.

(57) ABSTRACT

A method of modeling a monitorable stage in a process is provided. The method including the steps of: (a) measuring at least one input value of a parameter of the monitorable stage of the process; (a) measuring at least one output value of the parameter of the monitorable stage of the process; and (c) utilizing the at least one input value and the at least one output value for constructing a process output empirical model for uncovering a functional relationship between the at least one input value and at least one output value, the step of constructing the process output empirical modeler being effected by: (i) dividing at least one interval of the parameter into a plurality of sub intervals, such that each of the at least one interval is divided into at least two of the sub intervals; (ii) classifying the at least one output value according to the plurality of sub intervals, thereby presenting the at least one output value as a plurality of discrete variables defining the at least one output value; and (iii) using the plurality of discrete variables defining the at least one output value for defining the functional relationship between the at least one input value and the at least one output value, thereby modeling the monitorable stage of the process.

26 Claims, 14 Drawing Sheets

OTHER PUBLICATIONS

On the Epistemology and Management of Electronic Design Automation Knowledge, Scott et al, http://www.azstarnet.com/˜scottmc/medak/Epistermology.htm [17 pages].

Army Medical Knowledge Engineering System (AMKES)—A Three-Tier Knowledge Harvesting Environment, Merritt et al, Practical Applications of Java 1999 Conference Proceedings, http://amzi.harvard.net/articles/amkes_pajava99.htm [7 pages].

Final Model Business Case Report for the OSD CALS IWSDB Project, An MVP Joint Venture, ManTech International Corporation, Dec. 2, 1994, Kidwell et al., http://www2.dcnicn.com/cals/iwsdb/task07/html/a024/Fmodbus1.htm [77 pages].

Computer Aided Knowledge Engineering, British Steel, Mackenzie, http://www.cogsys.co.uk/cake/CAKE-TestSite-BS.htm [12 pages].

Constructivist Foundations of Modeling—A Kantian Perspective, Marco C. Bettoni, Internat. Journal of Intelligent Systems, vol. 12, No. 8, Aug. 1998, pp 577-595.

Knights Technology, Inc. at-a-Glance, http://www.knights.com/ktglance.htm [18-pages].

Work in Progress: Visual Specification of Knowledge Bases, Gavrilova, et al http://www.csa.ru/Inst/gorb_dep/artific/IA/ben-last.htm [8-pages].

Object Space Solutions for a Connected World, http://www.ObjectsSpace.com/products/prodCatalyst.asp [11-pages].

Adventa Corporate Overview, http://www.adventact.com/corporat.htm [28 pages].

Domain Manufacturing, http://www.domainmfg.com/mfg/starfire/industry-specific-auto.htm [10 pages].

HPL Corporate http://www.hpl.com/Corporate/history.htm [6 pages].

SEMY Engineering Home Page http://www.semy.com [9 pages].

KLA-Tencor: Leading the Yield Management Market http://www.tencor.com [15 pages].

Yield Dynamics, Inc. http://www.ydyn.com/products/yield.htm [9 pages].

* cited by examiner

POEM – Vectors Discretization Table

| input_id | output_id | discretization_symbol | discretization_value |
|---|---|---|---|
| 5 | 9 | A | 2.4 |
| 5 | 9 | B | 2.5 |
| 5 | 9 | C | 2.8 |
| 5 | 9 | D | 3.0 |
| 6 | 9 | A | 450.0 |
| 6 | 9 | B | 475.0 |
| 6 | 9 | C | 525.0 |
| 6 | 9 | D | 550.0 |
| 7 | 9 | A | 326.5 |
| 7 | 9 | B | 335.1 |
| 7 | 9 | C | 352.4 |
| 7 | 9 | D | 361.0 |
| 8 | 9 | A | 230.0 |
| 8 | 9 | B | 245.0 |
| 8 | 9 | C | 275.0 |
| 8 | 9 | D | 290.0 |

Fig. 7

Model Raw Data

| 6 Cols / 112 Rows | RR press | Platen speed | Pad life (sec) | Polish Time | Uniformity | Avg. Removal |
|---|---|---|---|---|---|---|
| 1 | 6.4 | 83.0 | 3171 | 64 | 7.1 | 3272.0 |
| 2 | 6.9 | 103.0 | 3778 | 60 | 9.5 | 3469.0 |
| 3 | 6.5 | 83.0 | 11116 | 55 | 5.3 | 2776.0 |
| 4 | 7.2 | 83.0 | 3307 | 64 | 14.9 | 3430.0 |
| 5 | 6.8 | 103.0 | 3714 | 60 | 6.5 | 3266.0 |
| 6 | 7.7 | 103.0 | 3714 | 60 | 9.8 | 3532.0 |
| 7 | 6.5 | 123.0 | 3141 | 64 | 20.4 | 4022.0 |
| 8 | 6.5 | 83.0 | 11057 | 55 | 3.4 | 2604.0 |
| 9 | 7.3 | 123.0 | 3013 | 55 | 7.8 | 3866.0 |
| 10 | 7.3 | 103.0 | 3563 | 60 | 7.8 | 3523.0 |
| 11 | 7.3 | 123.0 | 3345 | 64 | 25.6 | 4348.0 |
| 12 | 6.5 | 123.0 | 2954 | 55 | 6.1 | 3401.0 |
| 13 | 6.5 | 123.0 | 11154 | 55 | 5.4 | 3375.0 |
| 14 | 6.5 | 123.0 | 2885 | 55 | 12.2 | 3397.0 |
| 15 | 6.4 | 83.0 | 2858 | 55 | 3.0 | 2656.0 |
| 16 | 6.5 | 123.0 | 3209 | 64 | 20.1 | 4120.0 |
| 17 | 7.3 | 83.0 | 11175 | 55 | 3.5 | 2992.0 |
| 18 | 6.9 | 146.9 | 3843 | 60 | 12.8 | 4120.0 |
| 19 | 7.2 | 83.0 | 3239 | 64 | 7.0 | 3333.0 |
| 20 | 6.5 | 123.0 | 11095 | 55 | 9.7 | 3371.0 |
| 21 | 6.8 | 53.0 | 3778 | 60 | 5.9 | 2329.0 |
| 22 | 7.2 | 83.0 | 3035 | 55 | 8.9 | 2968.0 |
| 23 | 6.4 | 83.0 | 3103 | 64 | 6.4 | 2995.0 |
| 24 | 7.3 | 123.0 | 3277 | 64 | 29.1 | 3900.0 |
| 25 | 7.3 | 123.0 | 3072 | 55 | 8.1 | 3690.0 |
| 26 | 6.1 | 103.0 | 3650 | 60 | 11.5 | 3282.0 |
| 27 | 6.4 | 83.0 | 2817 | 55 | 4.8 | 2835.0 |
| 28 | 7.2 | 83.0 | 2976 | 55 | 3.0 | 2759.0 |
| 29 | 7.2 | 103.0 | 3566 | 45 | 3.7 | 2620.0 |
| 30 | 7.3 | 83.0 | 11234 | 55 | 8.0 | 2932.0 |
| 31 | 7.3 | 123.0 | 11272 | 55 | 13.4 | 3671.0 |
| 32 | 6.5 | 83.0 | 11302 | 64 | 4.3 | 3104.0 |
| 33 | 6.5 | 123.0 | 11340 | 64 | 10.4 | 3928.0 |

Fig. 9

POEM - Vectors Lookup Table

| input | Vector value | n | sigma | Sigma std_error | Mean std_error | Vector code |
|---|---|---|---|---|---|---|
| 83 | 2700.0 | 241 | 250 | 62 | 52 | BBBBB |
| 83 | 3300.0 | 326 | 201 | 65 | 55 | FFFFF |
| 83 | 3948.9 | 250 | 235 | 63 | 53 | BBBBC |
| 83 | 4148.9 | 300 | 237 | 71 | 61 | BBBBD |
| 83 | 4348.9 | 200 | 195 | 52 | 42 | BBBBE |
| 83 | 4548.9 | 261 | 215 | 62 | 52 | BBBBF |
| 83 | 3702.9 | 270 | 201 | 64 | 54 | BBBCB |
| 83 | 3902.9 | 301 | 200 | 71 | 61 | BBBCC |
| 83 | 4102.9 | 205 | 197 | 59 | 49 | BBBCD |
| 83 | 4302.9 | 268 | 231 | 63 | 53 | BBBCE |
| 83 | 4502.9 | 266 | 182 | 65 | 55 | BBBCF |
| 83 | 3656.9 | 310 | 201 | 70 | 60 | BBBDB |
| 83 | 3856.9 | 295 | 221 | 69 | 59 | BBBDC |
| 83 | 4056.9 | 195 | 301 | 72 | 62 | BBBDD |

Fig. 11

SYSTEM AND METHOD FOR MONITORING PROCESS QUALITY CONTROL

FIELD OF THE INVENTION

The present invention relates to a system and method for automatic learning and rule induction from data. It could be applied to any situation where a cause and effect relationship between a plurality of input parameters and an output parameter, and historical data of the said input and output parameters is available. When applied to a process, the present invention relates to a system and method for monitoring and optimizing process quality control and, more particularly but not exclusively, to a system and method which employs an algorithm to provide a model useful for accurate and sensitive monitoring of a process, which enables detection of parameter(s) deviation even at early stages of a process.

BACKGROUND OF THE INVENTION

In many areas and situations a cause and effect relationship between a plurality of input parameters and an output value exists. The present invention relates to a system and method for automatic learning and rule induction from data. More specifically, the present invention is a system and method to uncover the multivariate functional relationship between the input and output parameters. This function constitutes an empirical model of the relationship. It could be applied to any situation where historical data of input and output parameters is available. One of the areas that the present invention is applied is Process Quality Control. Traditionally, quality control of simple processes involves the classification of end products. In more complicated processes, which utilize numerous process stages, some quality control is affected in intermediate stages, involving the classification of intermediate products.

For example, in a chemical process, which includes numerous stages, inspection samples are typically drawn at random at various stages of the production line and inspected for being within predefined control limits.

A quality control methodology which is indicative of the quality of end products, is at times unacceptable for some processes since it cannot detect variabilities in intermediates produced.

Some processes, such as those employed by the semiconductor industry, utilize statistical process control (SPC), which uses control charts to analyze each major process stage and generate a predictable distribution chart for measured parameters (outputs) at each stage. A measured parameter which deviates from its distribution chart by more than, for example, three standard deviations is taken as indicative of process problems.

Although such quality control far supersedes that effected by sample inspection, it still suffers from several inherent limitations. The main reason is that the traditional SPC monitors an output with respect to the entire statistical distribution of this output. Each input combination defines a distribution of the related output, thus the overall distribution consists of many (sub) distributions.

By monitoring outputs with to their own specific distribution we achieve a much higher degree of accuracy. For example, the distribution charts of process outputs at various stages cannot detect undesirable combinations of input variables (e.g. such in which the unfavorable effect of the inputs on the monitored process output are mutually compensated), as long as the process outputs are within specifications. As a result, such quality control methodology cannot be utilized for early detection of variability in a process, nor can it be utilized to detect and point out deviations in individual variables, which may be important for understanding process related problems.

There is thus a widely recognized need for, and it would be highly advantageous to have, a system and method for process quality control devoid of the above limitations.

SUMMARY OF THE INVENTION

According to one aspect of the present invention there is provided a method of modeling a monitorable stage in a process, the method comprising the steps of: (a) measuring at least one input value of a parameter of the monitorable stage of the process; (a) measuring at least one output value of the parameter of the monitorable stage of the process; and (c) utilizing the at least one input value and the at least one output value for constructing a process output empirical model for uncovering a functional relationship between the at least one input value and at least one output value, the step of constructing the process output empirical modeler being effected by: (i) dividing at least one interval of the parameter into a plurality of sub intervals, such that each of the at least one interval is divided into at least two of the sub intervals; (ii) classifying the at least one output value according to the plurality of sub intervals, thereby presenting the at least one output value as a plurality of discrete variables defining the at least one output value; and (iii) using the plurality of discrete variables defining the at least one output value for defining the functional relationship between the at least one input value and the at least one output value, thereby modeling the monitorable stage of the process.

According to another aspect of the present invention there is provided a method of assessing the quality of a monitorable stage of a process, the method comprising the steps of: (a) constructing a process output empirical model for uncovering a functional relationship between an input value and an output value of a parameter of the monitorable stage of the process, the step of constructing a process output empirical model being effected by: (i) dividing at least one interval of the parameter into a plurality of sub intervals, such that each of the at least one interval is divided into at least two of the sub intervals; (ii) classifying at least one output value according to the plurality of sub intervals, thereby presenting the at least one output value as a plurality of discrete variables defining the at least one output value; and (iii) using the plurality of discrete variables defining the at least one output value for defining a functional relationship between at least one input value and at least one output value, thereby modeling the monitorable stage in the process; (b) applying the process output empirical model to a measured input value of the monitorable stage so as to predict a distribution of the output value of the monitorable stage; and (c) comparing a measured output value of the monitorable stage to the distribution of the output value of the monitorable stage predicted in step (b) to thereby assess the quality of the monitorable stage of the process.

According to yet another aspect of the present invention there is provided a system for assessing the quality of a process, the system comprising a data processing unit being for: (a) receiving a measured input value of a parameter of a monitorable stage of the process; (b) predicting a distribution of an output value of the parameter of the monitorable stage of the process according to the measured input value, the step of predicting being effected by a process output empirical model being executed by the data processing unit, the process output empirical model being generated by: (i) dividing at least one interval of the parameter into a plurality of sub intervals, such that each of the at least one interval is divided into at least two of the sub intervals; (ii) classifying at least one output value of the parameter according to the plurality of sub intervals, thereby presenting the at least one output value as a plurality of discrete variables defining the at least one output value; and (iii) using the plurality of discrete variables defining the at least one output value for defining the functional relationship between the at least one input value and at least one output value; and (c) comparing a measured output value of the parameter to the distribution of the output value of the parameter predicted in step (b), to thereby assess the quality of the monitorable stage of the process.

According to further features in preferred embodiments of the invention described below, each sub interval of the at least two sub intervals encompasses a non-overlapping subset of output values.

According to still further features in the described preferred embodiments the functional relationship is defined via a discrete function.

According to still further features in the described preferred embodiments the step of constructing the process output empirical modeler further includes the step of: (iv) statistically testing the discrete function for the goodness of the statistical result.

According to still further features in the described preferred embodiments the process is selected from the group consisting of a medical diagnostic process, a wafer production process and a trade order execution process.

According to still further features in the described preferred embodiments the monitorable stage of the process is a wafer chemical mechanical polishing stage of a wafer production process.

According to still further features in the described preferred embodiments the system further comprising at least one sensor being in communication with the data processing unit, the at least one sensor being for collecting data from the monitorable stage of the process, the data including the at least one input value and the at least one output value of the parameter.

According to yet an additional aspect of the present invention there is provided a method of assessing the quality of a monitorable stage of a process, the method comprising the steps of: (a) processing at least one output value of a parameter of the monitorable stage of the process so as to generate discrete variables representing the at least one output value; (b) defining a function for associating the discrete variables and at least one input value of the parameter of the monitorable stage of the process; (c) applying the function to a measured input value of the monitorable stage so as to predict a distribution of the output value of the monitorable stage; and (d) comparing a measured output value of the monitorable stage to the distribution of the output value of the monitorable stage predicted in step (c) to thereby assess the quality of the monitorable stage of the process.

According to still an additional aspect of the present invention there is provided a system for assessing the quality of a monitorable stage of a process, the system comprising a data processing unit being for: (a) processing at least one output value of a parameter of the monitorable stage of the process so as to generate discrete variables representing the at least one output value; (b) defining a function for associating the discrete variables and at least one input value of the parameter of the monitorable stage of the process; (c) applying the function to a measured input value of the monitorable stage so as to predict a distribution of the output value of the monitorable stage; and (d) comparing a measured output value of the monitorable stage to the distribution of the output value of the monitorable stage predicted in step (c) to thereby assess the quality of the monitorable stage of the process.

According to still further features in the described preferred embodiments the function is defined via non-parametric statistics.

According to still further features in the described preferred embodiments the function is a discrete function.

According to still further features in the described preferred embodiments the discrete variables are generated by dividing at least one interval of the parameter into a plurality of sub intervals and classifying the at least one output value according to the plurality of sub intervals.

According to still further features in the described preferred embodiments the system further comprising at least one sensor being in communication with the data processing unit, the at least one sensor being for collecting data from the monitorable stage of the process, the data including the at least one input value and the at least one output value of the parameter.

Embodiments of the invention address the shortcomings of the presently known configurations by providing a system and method for assessing the quality of at least one monitorable stage of a process thus enabling to optimize the process in a model which is useful for accurate and sensitive monitoring of the process. The model preferably enables detection of parameter(s) deviation even at early stages of the process

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 7 illustrates the discretization of the four input streams and the assignment of different output distributions to each input (vector) combination, FIG. 9 shows a table of raw data collected during a chemical mechanical polishing (CMP) stage of wafer production, FIG. 11 shows a look-up table generated by the algorithm of the present invention, which is useful for predicting a distribution of an output value according to a measured input value.

DESCRIPTION OF THE PREFERRED EMBODIMENTS

Figure 1:
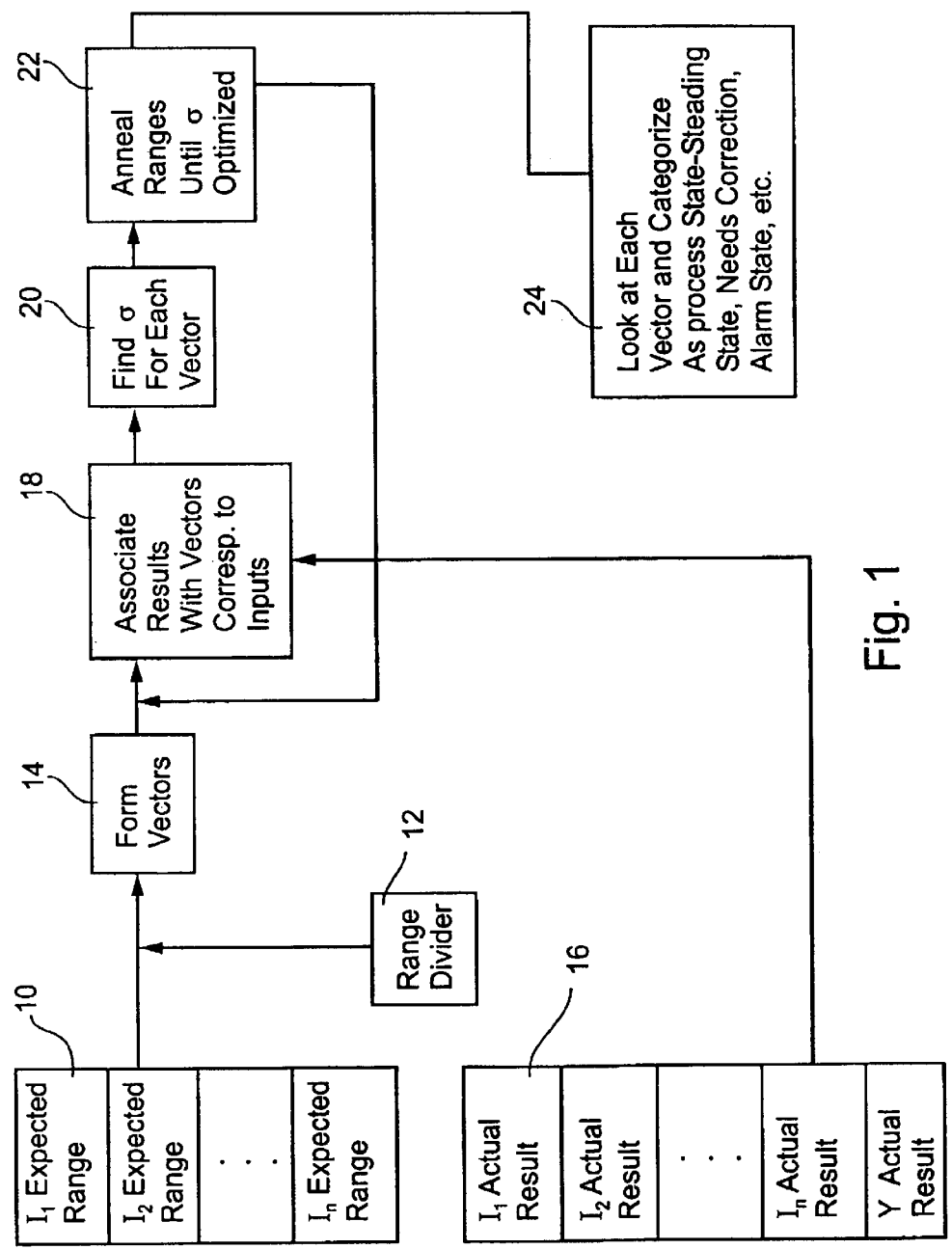
FIG. 1 is a generalized block diagram showing a first embodiment of the present invention configured in a learning mode.

The present invention is of a system and method, which can be utilized to optimize at least one stage of a process. Specifically, the present invention can be used to generate a model for functionally relating input and output values of a parameter of the at least one stage in a process so as to enable prediction of a distribution of an output value based on an input value measured from the process.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

It will be appreciated that any process stage, which includes measurable inputs and outputs, can be modeled and assessed for quality and thus optimized utilizing the process output empirical modeler of the present invention. Examples of such processes include but are not limited to, medical diagnostic processes, such as the diagnosis of pathologies according to blood tests, wafer production processes, such as the chemical polishing stage of wafer production, or trade order execution processes. The application of the process output empirical modeler to such processes is described in detail in the Examples section which follows.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Reference is now made to FIG. 1, which shows a system according to a first embodiment of the present invention configured in a learning mode. Generally a system according to embodiments of the invention has a learning mode during which it collects and arranges input and output data of a process in order to develop a model and an operating mode during which it monitors a process according to the model developed during the learning mode.

The model takes a series of inputs and at least one output, and follows the process for a statistically significant period of time so that an empirical relationship can be built up between different values at the inputs and measured output values. In FIG. 1, a series of input parameters I1 . . . In are each assigned expected ranges in a parameter definition unit 10. The expected ranges are discretized into subranges by a range divider 12 and then a series of vectors is formed of each possible combination of subranges in a vector former 14. For example if there are three inputs and each input is divided into three subranges then 27 vectors are formed.

Each one of the 27 vectors thus covers a certain part of the input space and will correspond to a certain portion of the output space.

Now the process is allowed to start and measurements are made of actual input and corresponding output values in a measurement input unit 16. A result categorizer 18 then takes each y output measurement and looks at the corresponding inputs that gave rise thereto. Each one of the corresponding inputs may be associated with a subrange as defined by the range divider and thus each input y value may be associated with one of the vectors.

Measurement is continued until it is felt that a statistically significant sample of results is built up. This may be after many thousands of measurements. Thus each vector should have a large number of y results associated therewith. There should be enough y results associated with each vector to give a meaningful statistical distribution per vector. The statistical distribution per vector may be studied in a statistical analysis unit 20. Statistical analysis preferably includes using some kind of score to indicate the goodness of the statistical results.

Following statistical analysis of each vector annealing of the vectors is carried out, in an annealing unit 22 by changing the boundaries between subranges. The y results are then reassigned to the annealed vectors by the results categorizer 18 and the statistical analysis is repeated, a new score being calculated. If the score is better than previously the new boundaries are accepted. The loop is repeated until a condition is fulfilled which indicates that the best possible result has been found. Several possible types of condition will suggest themselves to the skilled person. Preferably the condition chosen will not allow calculation to stop at a local maximum when there is a much larger global maximum still to find.

Once the best possible vector set according to the annealing algorithm has been achieved, then the vectors are analysed, in a vector analysis unit 24 in the light of the results shown and the process. Those vectors having the highest numbers of results tend to represent the steady state region of the process. Those vectors having the lowest numbers of results tend to represent undesirable states in the process. Vectors in between the two extremes often represent states in which minor changes could usefully be made to the input values in order to better maintain the steady state. The vectors having the lowest numbers of corresponding results may thus be associated with alarms, demanding immediate action to be taken in the process. The intermediate vectors may be associated with advice given to the process manager or minor tweaks to the process. The steady state vectors may be associated with very minor tweaks depending on the associated input variables.

An advantage of the use of the vectors is that although a certain overall result may be perfectly acceptable, the vector may easily show that a certain input value is heading out of line and is being masked by other input values compensating for it. This is a situation which is hard for a process engineer to spot but which the vector model will reveal quite easily.

More generally, the vectors represent the inputs that gave rise to any given output produced by the process. In the prior art it was necessary to see a perturbation in the output and from that to deduce that there was something wrong and then use a combination of experience and guesswork to decide which input to change to correct the problem. With embodiments of the present invention however, an automatic association is drawn up between a received output and the inputs that are likely to have given rise to it. Thus the model is able to deduce that a certain input needs correcting even if the overall result looks totally acceptable.

In particular the model preferably provides an analysis of a process involving multiple inputs in terms of all of the inputs in an empirical manner. In prior art systems, only the behavior of one or at most a small number of inputs was effectively accounted for and in general, it was not possible to see when the effect of one input was being masked by another.

Figure 2:
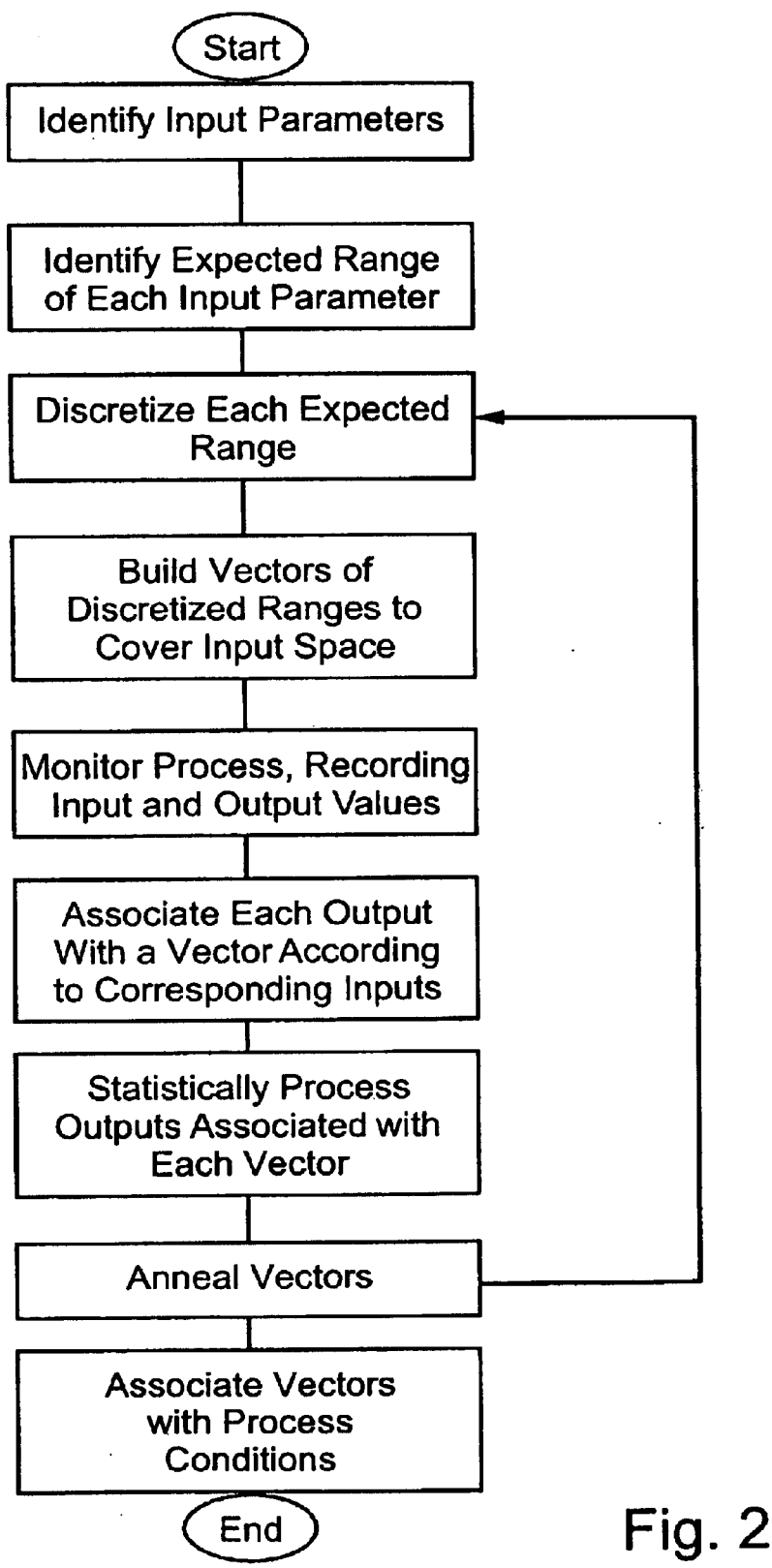
FIG. 2 is a generalized flow diagram of the learning state of the embodiment of FIG. 1.

Reference is now made to FIG. 2, which is a generalized flow diagram of the system shown in FIG. 1. In FIG. 2, a series of input parameters are identified as being significant in effecting the output of a process. Each input parameter has an expected range. Each expected range is discretized into a series of subranges and a vector is built for each possible combination of subranges. The process is then monitored to obtain a statistically significant set of samples, each sample comprising a process output and the inputs corresponding thereto.

Each output is then attached to the vector that corresponds to its inputs, so that at the end of the sampling period many thousands of samples have preferably been taken and at least most of the vectors have a set of results associated therewith which are statistically analyzable. The vectors are annealed based on the results of a statistical analysis, as described above.

Figure 3:
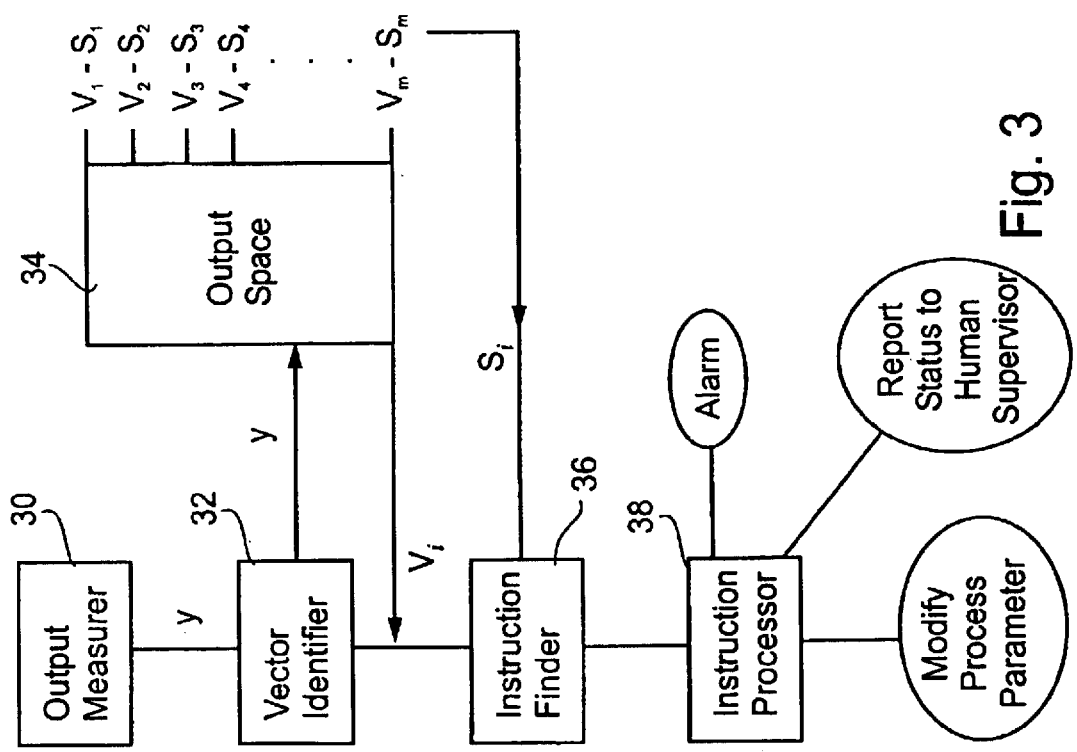
FIG. 3 is a generalized block diagram of a process control state of the embodiment of FIG. 1.

Reference is now made to FIG. 3, which is a generalized block diagram showing how a model derived as described above in respect of FIGS. 1 and 2 may be used for monitoring and control of a process.

In FIG. 3, an output measuring device 30 obtains an output measurement y from the process. A vector identifier 32 relates the measured y to the total output space and finds the vector v1 . . . vn that best describes that output. The vector is associated with some state of the process, indicated by a label s attached to the vector. The label is analysed by an instruction interpreter 36 and if it requires an action to be performed then an action processor 38 carries out the action. The action may, for example, be to set off an alarm and halt the process immediately, inform the supervisor that a certain input needs correcting, or automatically modifying a process input, or even simply provide a status report.

Figure 4:
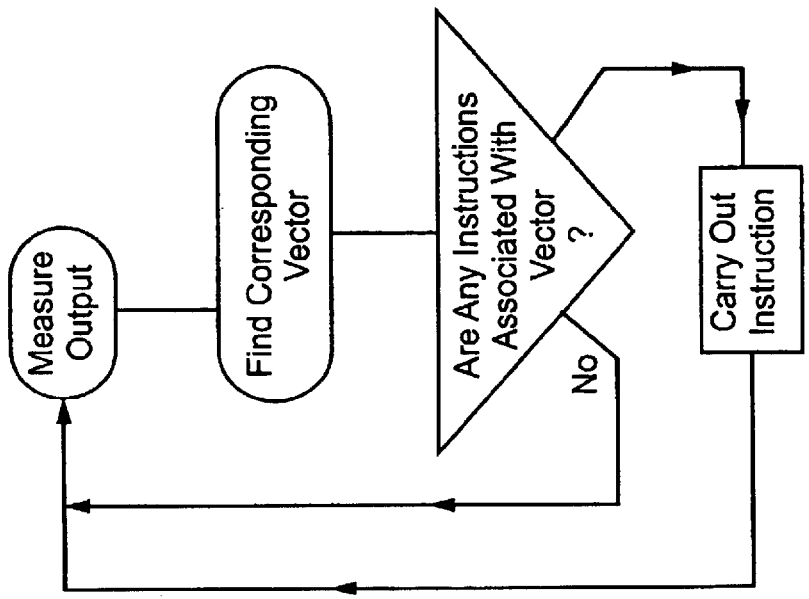
FIG. 4 is a generalized flow diagram of the process control state of FIG. 3.

Reference is now made to FIG. 4, which is a generalized flow diagram showing the system of FIG. 3. As shown in FIG. 4, an output of the process is measured. The measured output is associated with a corresponding vector, and any action associated with the corresponding vector is then carried out as necessary.

Figure 5:
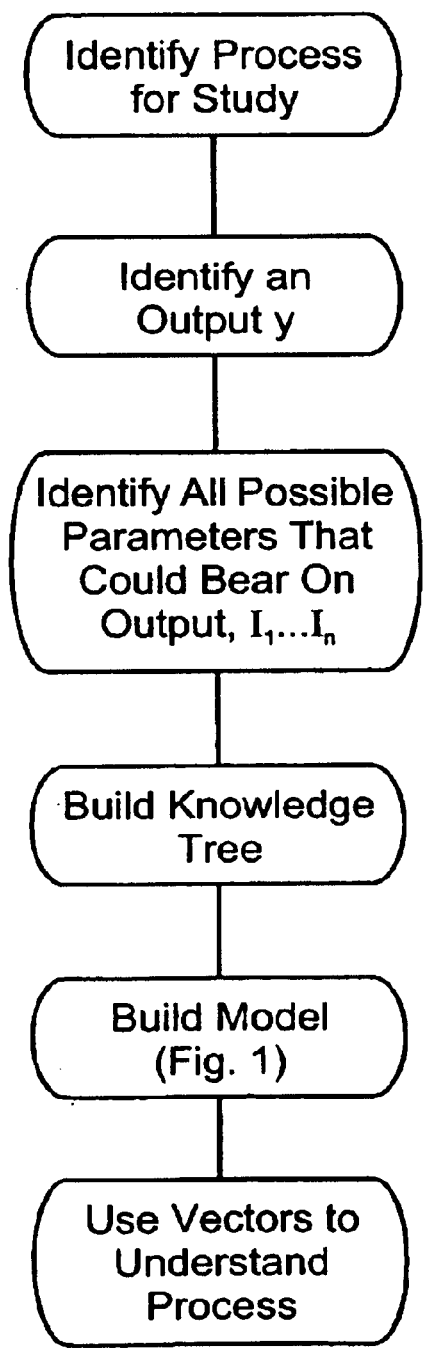
FIG. 5 is a generalized flow diagram showing how a model built using the learning mode of FIG. 1, can be used to obtain an understanding of a process.

Reference is now made to FIG. 5, which is a flow diagram showing how a model of the type described above may be used as an aid to understanding a process. In the embodiment of FIG. 5 a process is first identified for study. An output of the process is then identified. The process under study may be a part of an overall process, but it should have an identifiable output.

Once an output has been identified, then all parameters that could possibly affect the output are identified. This could for example be assisted by building a knowledge tree.

The process is then empirically monitored and a series of vectors are built up using the procedure of FIGS. 1 and 2. The vectors may then be analysed to indicate which are important inputs to the process, whether any inputs are irrelevant, and what actions can be associated with given inputs to better manage the process. If the model fails to converge, that provides a good indication that a significant parameter has been omitted.

For example a control engineer in charge of a process for manufacturing semiconductors may feel that a significant factor is not being taken into account. A knowledge tree is built up indicating all factors present in the manufacturing environment. Use of the above method allows empirically determined values to be assigned to each node of the tree. Analysis of the tree may then for example indicate that the missing factor is background room temperature. Once the tree has been created using the above method, it is then possible to use intelligent decision-making to decide, based on the tree, what corrective action to take.

As a further example, if the process is being run on several machines in parallel, the machine used may be found to be a variable. Analysis of the tree may be able to identify that certain other parameters behave differently on the different machines. Thus vectors indicating a certain quality of input material may be associated with good output values with one of the machines and worse output values on another machine. Intelligent decision making may indicate that input material can be assigned to the different machines on the basis of its quality.

When programming intelligent decision-making it is preferable to classify variables as easy to change, difficult to change and beyond the possibility of control. Also, it will often be the case that monitoring will be confined to a part of a process but that the method will indicate that a change is needed to a previous stage in the process.

It will be noted that whereas most of the description above has described continuously variable parameters which are then discretised, a "machine used" parameter is already a discrete variable and can be incorporated directly into vector formation.

As will be indicated in the examples below, the process need not be restricted to the field of industrial manufacture. The method of FIG. 5 is applicable to any situation in which an output can be analysed in terms of a plurality of inputs.

An example of a non-industrial application in which a correct analysis of the data requires careful relating of the outputs to the individual inputs is a program to advise people regarding body weight. The use of a person's body weight as a basis for a medical recommendation is likey to fail unless the weight is effectively correlated with age, height, sex and other parameters before being associated with medical outcomes.

An embodiment of the present invention may provide a process output empirical modeler (POEM) which can be utilized to define an empirical relationship between measured input value(s) and output value(s) of a parameter or parameters associated with a single process stage.

Enlarging on what has been described in respect of FIG. 1, by denoting a given set of measured input values of a measured parameter as $I=\{I_1,I_2,I_3, \ldots, I_k\}$, and a resulting output measurements of the same parameter as Y it is possible to calculate a functional relationship between an input and output value of such a parameter. This can be achieved by the following: $Y=F(I_1,I_2,I_3, \ldots, I_k)$, wherein F represents a function which is determined according to the teachings of the present invention as is further exemplified hereinunder and which enables to predict an output value Y, at the end of the stage, from the values of the input variables (see Scheme 1).

Scheme 1

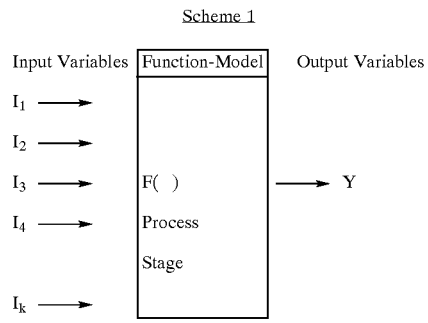

F is generated by processing actual measured parameter values and employing non-parametric statistics. The resulting functional relationship describes the behavior of a process stage and can be used for modeling of the process stage, thus allowing simulation, prediction and process control.

A Basic Algorithm

Assuming that the measurements of each input parameter, Ij, in a process varies within a known interval, based on actual data, one can divide this interval into a number of sub intervals. As is further exemplified herein, the measurements of parameter Ij is classified according to sub intervals and is thus presented and treated as discrete variables. The actual method of interval division into sub intervals, and the number of sub intervals thereby formed, may be left to the discretion of the skilled person. Therefore, for reasons of clarity and without any intention of loss of generality, assume that the interval of values of parameter Ij is divided into three sub intervals of equal length, denoted by Aj, Bj and Cj. Thus, each individual measurement is classified to either the Aj, Bj or Cj sub intervals and a measurement array of all k input values of the process stage is represented by a k-tuple, in which each entry assumes one of the values Aj, Bj or Cj.

For example, assume a function of 4 variables (k=4) and for all j as follows: $0 \leq Aj < 10$, $10 \leq Bj < 20$, $20 \leq Cj \leq 30$ and an array of the input measurements (or input vector), corresponding to the output measurement 17.40, is equal to (12.00, 5.56, 23.20, 3.00).

Omit the index j, and denote the first interval by A, the second by B, and the third by C.

In a functional notation: 17.40=F(12.00, 5.56, 23.20, 3.00). In this case, the discrete vector [B, A, C, A] is associated with the value 17.40.

Construct a discrete function FD, which accurately represents the non discrete function F, provided the number of sub intervals is sufficiently large.

The discrete function FD assumes in this case exactly $3^4=81$ different discrete vectors. Any measurement input vector (which in this case is a 4-tuple) is classified in this case, to one of a finite number (81) of possible discrete vectors [A,B,C,A], [B,A,C,C], etc.

Now, take a large number of input vectors, each corresponding to a measured output, and translate each vector to the corresponding discrete vector. The different discrete vectors will typically appear many times in the list. For example, one may obtain n repetitions of the discrete vector [B, A, C, A], each corresponding to an output Yi. Similarly, for each of the 81 discrete vectors there will be a set of outputs.

Define the value of the discrete function FD at [B ,A, C, A] as the average of Yi, provided that certain statistical criteria, which is defined below, are met.

Thus Y=FD[B,A,C,A], where Y is the average of Yi. The standard deviation (SD) of the Y values is recorded for each discrete vector.

It is useful in some cases to record the whole distribution of the Y values, corresponding to each of the discrete vector.

Figure 6:
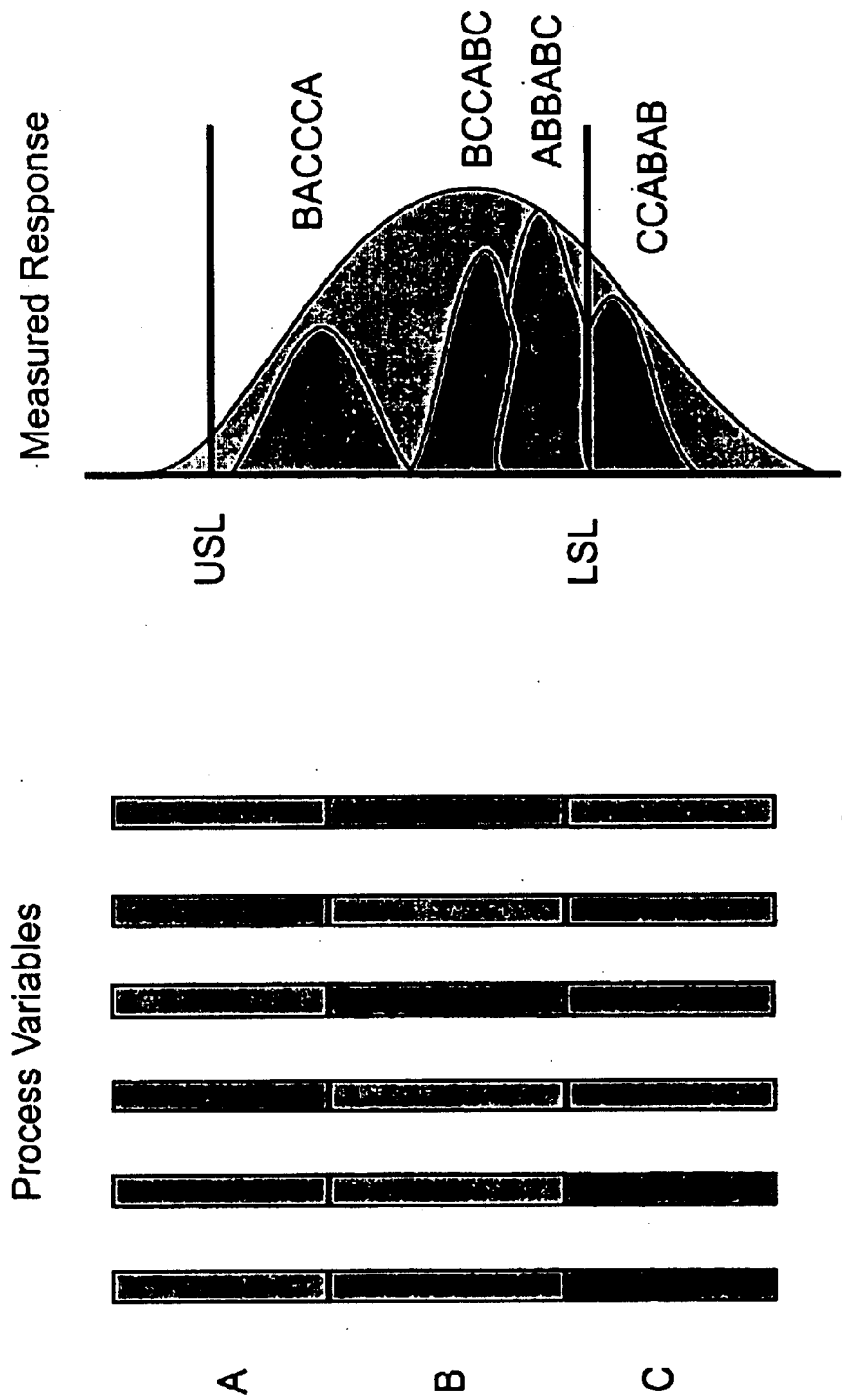
FIG. 6 represents a cause and effect functional relationship having six inputs (process variables), each variable interval is divided to three sub intervals (A, B and C) and graph depicting for various input combinations the process output distribution according to the teachings of the present invention.

Reference is now made to FIG. 6. FIG. 6 represents six input variables, which may each be divided into three discrete regions labeled A, B, and C. Thus the input space may be defined by a series of resulting input vectors which may be denoted BACCCA, BCCABC, etc. The corresponding output distributions differ in shape, size and location. If an output is to be defined between upper and lower specification limits (USL and LSL respectively) suitable response distributions are selected.

Repeating the above mentioned process a finite number of times defines the discrete function FD. Using FD as a discretization stage, a continuous function (model) F is generated.

As described above, each sample of data can be described as a distribution with a mean, a range and a standard deviation within predefined upper and lower limits. Each sample may comprise values of two or more input parameters, and in the present illustration six such parameters are shown. Thus, as shown in the right hand side of the diagram an overall distribution can be defined as the sum of a plurality of separate parameter distributions.

The embodiment examines the input variables which lead up to the overall distribution, and, as a result of such an examination, is in a better position than the prior art to understand the overall process, since the prior art relates only to the overall distribution. Thus a specific one of the various input parameters can be identified as being responsible for variations etc. and this knowledge can be used, for example to decrease variability in the output.

The inputs themselves may be of a continuous nature, and in order to process them they are divided into discrete components, herein labeled A, B, and C. Vectors are formed for each of the possible letter combinations for the six inputs and any input received is assigned to the appropriate input vector.

Reference is now made to FIG. 7, which is a simplified tabular diagram showing a series of inputs and how they may be discretized. A series of inputs 5 to 8 are each related to an output 9. Each input is limited to a certain range but is otherwise continuous within that range. In the table each input range is divided into four sectors A to D.

Figure 8:
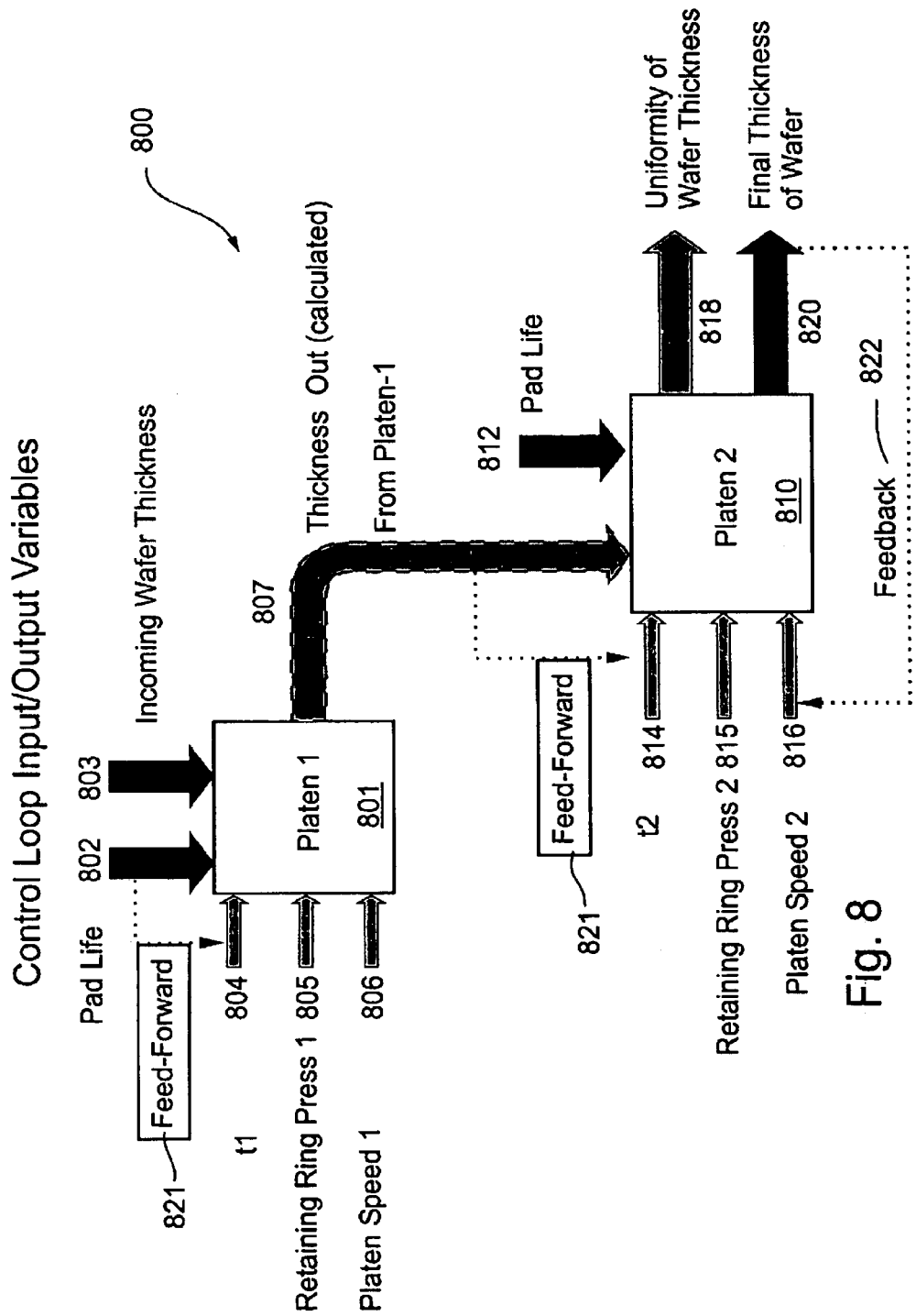
FIG. 8 is an example of a feedback control loop in the semiconductor industry implemented by the present invention.

Reference is now made to FIG. 8 which shows a series of vectors, all related to a single input, wherein each vector has a full set of statistical values associated therewith. The vectors are used to form a lookup table for interpreting measured output values, the vector value.

Function Determination

In the basic algorithm described above, the relationship Y=FD[S1,S2,S3,S4], where [S1,S2,S3,S4] is any one of the 81 discrete vectors, was defined using Y=average y, the average of measurements of output values corresponding to the vector.

In this section, a criterion of reliability of Y will be defined and sufficiently large number of repetitions (n) will be determined, such that the estimation of Y as an average will be accurate (under some defined criteria).

Taking the empirically measured outputs corresponding to each one of the vector (out of the 81 possible cases) as a random sample of Yj, where $1 \leq j \leq 81$, it is preferable to test the standard deviation or like statistical parameter among 81 sample means, or equivalently to test the null hypothesis that the sample means are practically equal. A suitable statistical tool for this test is the "Analysis of Variance" (ANOVA).

The first indication of the prediction capability of FD[S1, S2,S3,S4] is expressed by applying the ANOVA test to the different output means corresponding to the 81 discrete vectors. This will indicate whether a move from one vector to another vector yields a change in the value of the function FD. This is a necessary condition for a predictor FD. For each average Yi one calculates also the variance $\sigma i^2$ and a p-value pi.

In some cases, several different discrete vectors will correspond to the same output value. This is because, mathematically, FD is not necessarily a one-to-one function. In those cases, the average Yi, the variance $\sigma i^2$ and p-value pi, will be calculated for each cluster. Further, t-tests can be performed for any pair of clusters, to examine the hypothesis that two clusters means are equal. FD will have statistical significance if this hypothesis is rejected for any cluster pair.

Algorithm Evolution

Function fine-tuning:

Given a 4-structure, the specific division of each of the intervals (above, each interval was divided into equal sub intervals), as well as the number of sub intervals (above, the number was three), has in general an impact on the variance $\sigma^2$ and the p-value pi. Thus, cluster grouping and the related pairwise t-tests should also yield different results. Hence, the function's predictive quality may be improved. Using iterations of the algorithm, one applies the ANOVA test for different divisions of the intervals, in order to get lower values of the variance—$\sigma i^2$ and the p-value pi.

Elimination of Redundant Input Variables:

Although a comprehensive set of variables (I) may affect Y, some variables in the set I which have no effect on Y are redundant and thus could be eliminated; in other words, Y may be a function of a subset of I.

Thus, those variables in the set I that are redundant, are preferably eliminated such that the algorithm described above is applied to the most concisely effective set of input variables. This stage could be carried out by a number of different well-known algorithms, such as, but not limited to Factor Analysis and Principal Component Analysis, both widely used in conventional statistics.

If-Then Rule Learning

The function F described hereinabove has a continuous range, meaning that Y can assume any value in a given interval. If the range of Y's is divided into sub-intervals, an "If-Then" rule can be applied to the data as is further detailed hereinbelow.

Applications

The functional relationship described above can be applied to any process which includes one or more stages and which, for each of the stages, receives an input and produces an output. The use of the logical-mathematical model(s) generated according to the teachings of the above-described embodiments enables variability detection at a sensitivity level which far supersedes that achieved by prior art statistical models and as such greatly contributes to performance improvement and optimization of any process.

The following example describes the method of the present invention as applied to the semiconductor industry, which at the present uses very advanced and sophisticated process in terms of data availability and accessibility.

Semiconductor Manufacturing

Reference is now made to FIG. 8, which shows a stage in a wafer production process, which can usefully be monitored and controlled using a model according to the present invention.

In wafer production, a chemical mechanical polishing (CMP) process is used for polishing and removing an oxide layer from a wafer surface. In such a process, which is shown schematically in FIG. 8, it is essential to maintain a planarized wafer surface for processes which follow CMP. It will now be demonstrated how the algorithm of the present invention is used to optimize this process and reduce the final thickness variability of the wafers produced.

Initially, the CMP process is analyzed taking into account the various variables and the interactions therebetween.

Following analysis, a valid model which represents and qualifies the process interactions is constructed by running a set of experiments in which raw data is analyzed and thereafter utilized to generate a model.

An embodiment of the invention during a CMP process is realized in FIGS. 8–13. In the CMP process 800, which is shown in FIG. 8, a wafer is sequentially polished using two rotating platens; platen 1, 801 and platen 2, 810. In FIG. 8 arrows designate all the inputs and outputs of the process.

The measurable but uncontrolled inputs for the polishing process using platen 1 801 include the incoming wafer thickness 803 and pad life 802, i.e. the amount of time which the polishing pad is already in use at that platen.

The controllable inputs of the process are the retaining ring pressure 805, i.e. the pressure in which the wafer is pressed towards the polishing pad, the platen rotating speed 806 and the polishing time 804 of the wafer.

The thickness of the out coming wafer is an output parameter of the first polish stage performed at platen 1, 801; However it also serves as a known (either measured or calculated) input 807 for the second stage of the polish process which is performed at platen 2, 810.

The second stage has different values for its polish pad life 812, wafer's polish time 814, retaining ring pressure 815 and platen speed 816.

The wafer after this stage is characterized by its final thickness 820 and uniformity 818. These outputs are measured for each of the out coming wafer together with the corresponding input parameters at the second stage, that caused these outputs. All these values are tabulated in a raw data table 900, which is shown in FIG. 9.

In FIG. 9, it was assumed for the sake of simplicity of explanation, that all the incoming wafers have a nominal constant thickness, thus the effect of the incoming wafer's thickness was ignored and its respective input did not appear.

The entries in each of column (field) of raw data in table 900 are the values of the input which that field consists of.

As for inputs, the fields (columns) include values for the retaining ring pressure 905, the platen rotating speed 906, the pad life 902 and the polish time 904. As for the output parameters the fields include the uniformity score 918 and the removed thickness 919.

Thus, for an actual experiment (polishing a single wafer), the raw data is represented in a record (a certain row), e.g. row 920 of table 900.

Each input's range, i.e. the interval between the maximum and the minimum values of an input in a column, is then divided into subranges according to the teachings of the invention which was taught in connection to the formation of the discretization table that is shown in FIG. 7, so that each input can be represented by one of N levels of discrete parts.

Figure 10:
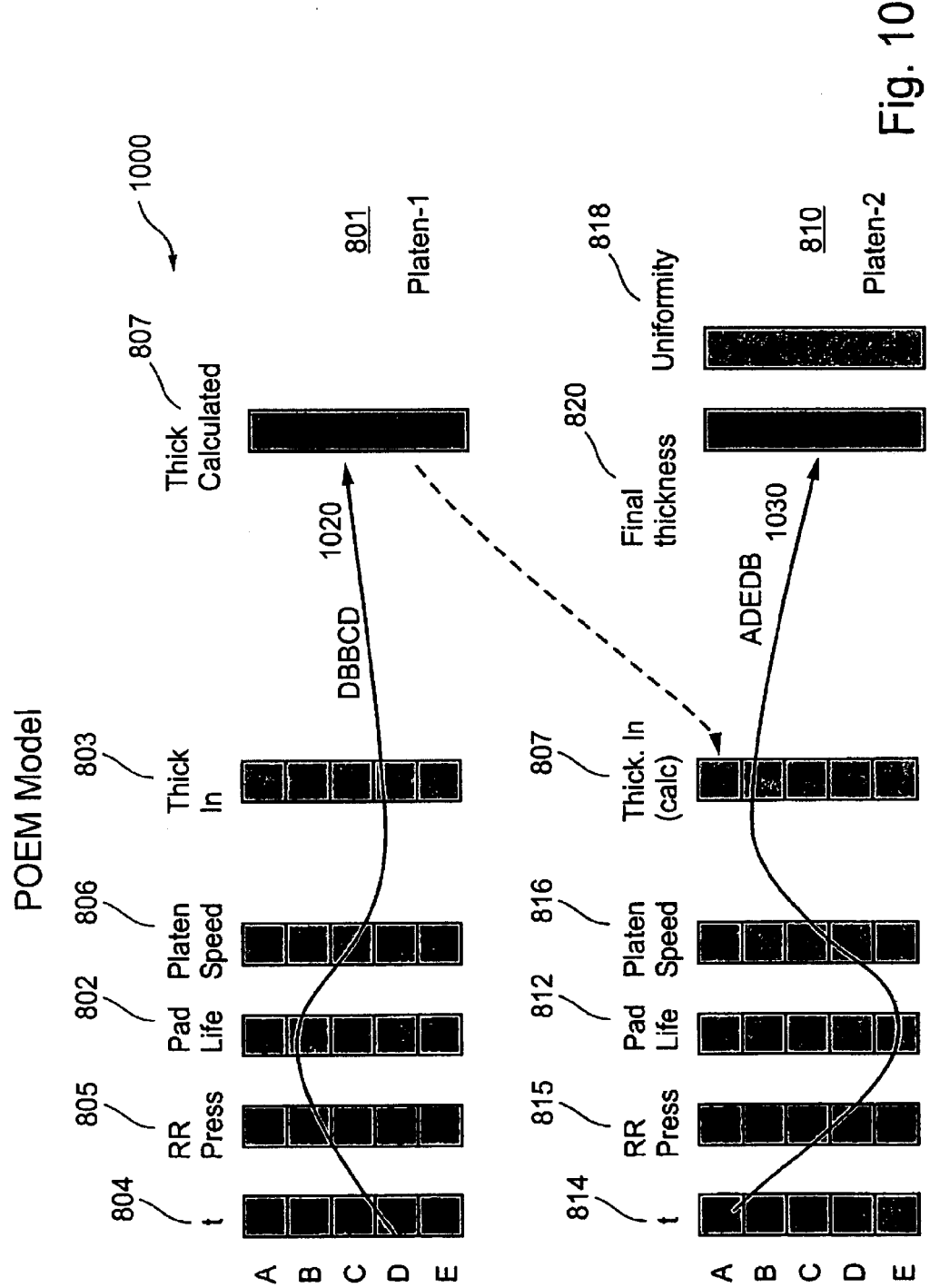
FIG. 10 shows input vectors construction in the implementation of a process output empirical modeler (POEM) to the process shown in FIG. 8.

This is shown in FIG. 10 for both stages of the CMP, where the various process inputs have the same notation as in FIG. 8.

In FIG. 10, N=5 (A to E) and a combination of the respective levels, a level per input, generates a vector e.g. vector DBBCD 1020 or vector ADEDB 1030.

Suppose that fine tuning was accomplished; e.g. that the boundaries of the subranges of each input parameter are such as to produce the most distinctive outputs. The next stage in this embodiment of the invention is to further provide raw data collected during a CMP actual job, to assign an input vector and an output result to each of the polished wafers, and to establish a lookup table of all the vectors and their respective output values; an example for such a lookup table is shown in FIG. 11.

FIG. 11 shows a look up table 1100 for the first stage which is performed at platen 1, 801 of the CMP process.

In FIG. 11, each of the vectors appearing in column 1101 of lookup table 1100 represents a CMP process setup in which each of its inputs is confined within its respective subrange. The resulting average wafer's thickness (vector value) and the standard deviation (sigma) for a sample population of n wafers which are included in a certain vector e.g. vector FFFFF 1106 of table 1100, are shown in column 1103 and 1104 of table 1100, the number of n is given in column 1102 of table 1100.

One would like to relate the values in columns 1103 and 1104 for each vector-j (a sample which include $n_j$ members) to the respective thickness mean and variance of the distribution of the real (entire) population of wafers which are the yield of a process having the input's values of that vector.

These statistical relations are represented in Columns 105 and 106 of table 1100, which show the mean and the sigma standard error respectively.

Feed forward, 821 in FIG. 8 is accomplished by a continuous on line monitoring of the values of the measurable inputs of the process for each wafer and dynamically assigning the controllable input accordingly to form the preferred vector having the desired output. As a result the setup of a polishing machine e.g. its platen rotation speed or its retaining ring pressure can be subjected to automatically changes each time a new wafer arrives.

This is an innovative routine in particular with regard to the first stage thickness output 807, which is fed forward as an input to the second stage.

Feedback, 822 in FIG. 8 is performed whenever one gets results which are off of target values, thus he has to shift toward process setup which is included in a different vector that according the look up table will divert the results into the target region.

For example, suppose a range of 4000±200 in wafer's final thickness is desired and one gets an unallowable thickness spread while working at an input setup which corresponds to vector BBBDD 1110 in vector lookup table 1100 of FIG. 11.

According to lookup table 1100, spread can be improved by changing the input setup into one of other three possible setups according to input vectors which are: BBBBC 1007, BBBCC 1008 and BBBCD 1009.

In this case the vector BBBCD 1009 is clearly preferable because among the three candidates, it has the lowest combination of sigma standard error with the mean standard error, thus it represents the most stable working envelope.

Figure 12:
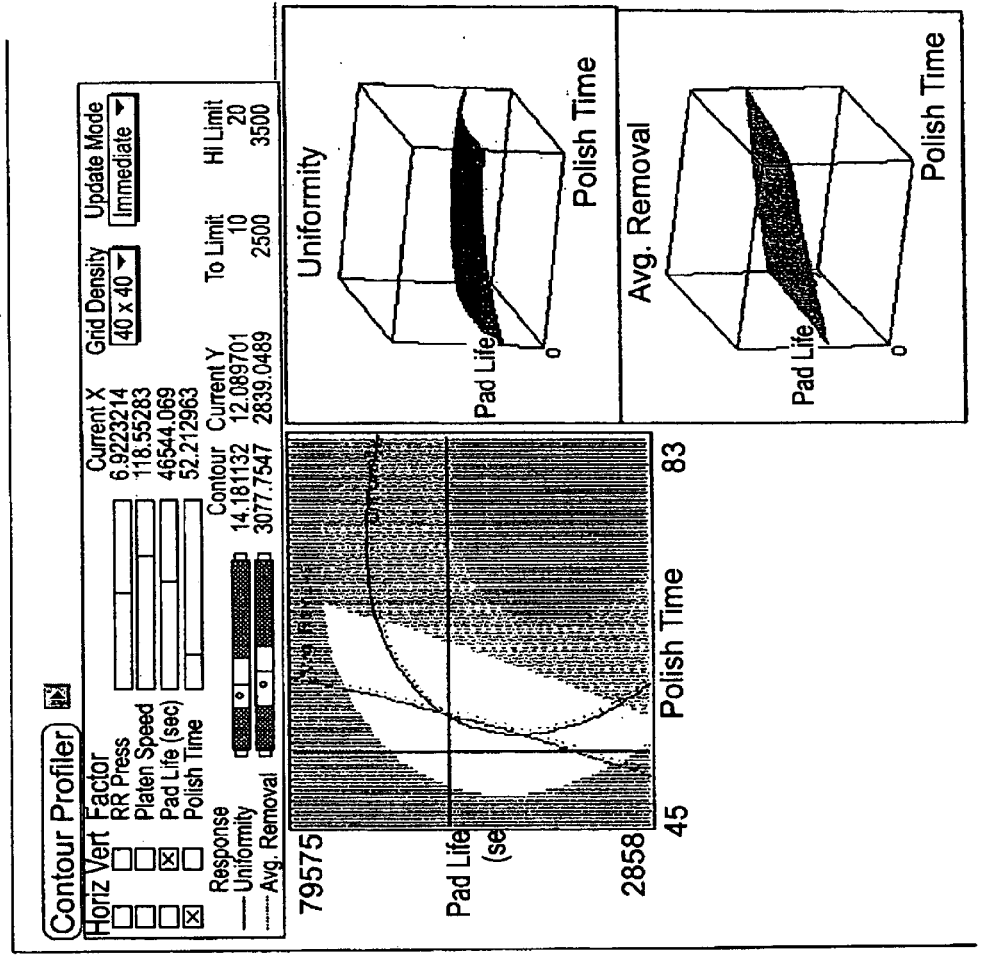
FIG. 12 is a window of a graphical interface during the computerized monitoring and control of the process shown in FIG. 8.

FIG. 12 shows a momentarily window of a window-based graphical interface during the on line computerized monitoring and control of the CMP process according to the present invention.

Figure 13:
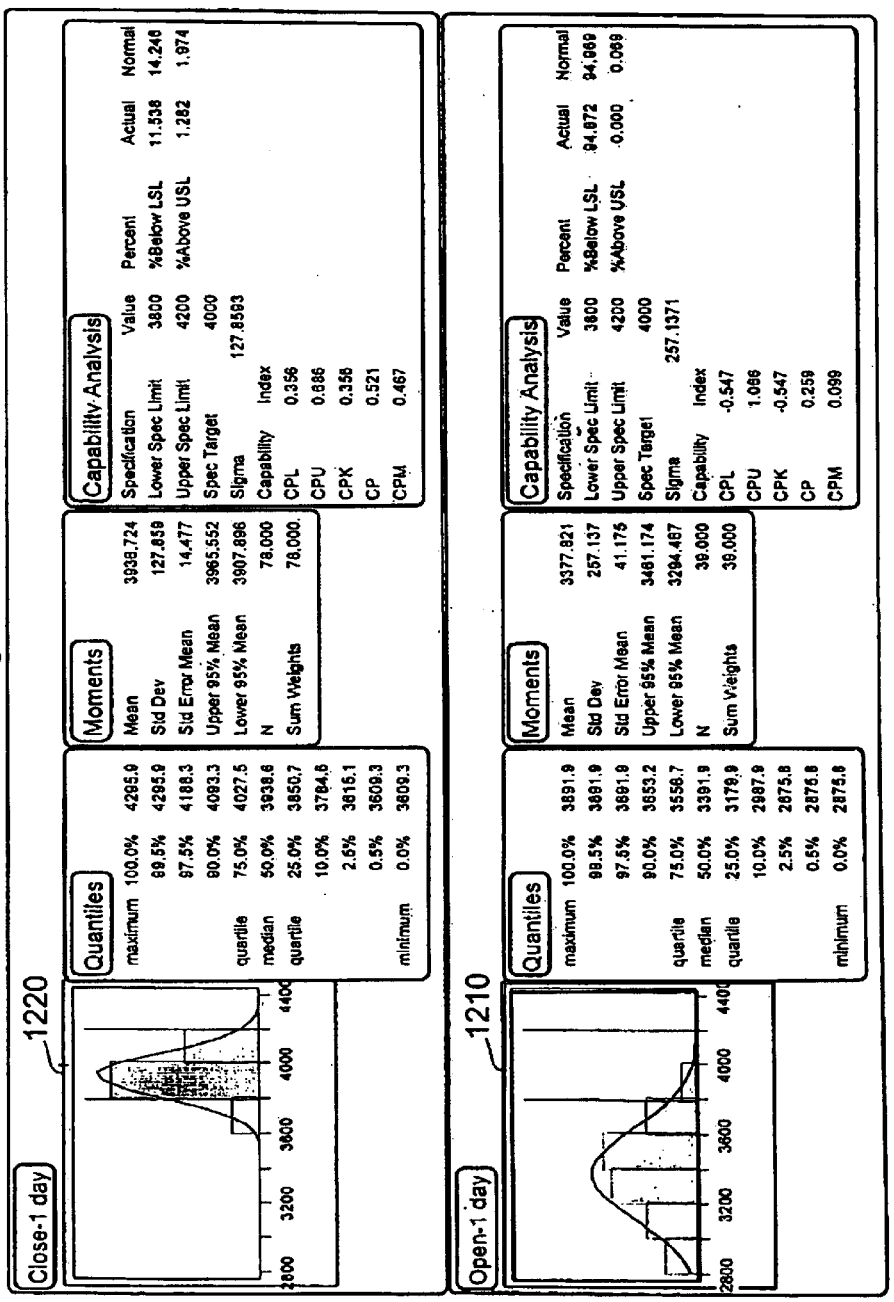
FIG. 13 illustrates an improvement achieved by applying the process output empirical modeler (POEM) to the CMP machine.

Reference is now made to FIG. 13 referenced as 1200, which shows two histogram charts 1210 and 1220 of a CMP processes according to the present invention. The upper process 1220, being the one in which the teaching of the present invention as described in this example was used to perform a closed loop process, while the lower chart 1210 represents an open loop process. The moments and capability analysis associated with each chart have their usual statistical meaning as accepted in the art of process control.

As it is evident from histogram charts 1220 and 1210 and their analysis, the CMP process in the closed loop process was improved by 50% in sigma terms compared to the open loop one, using the system and the algorithm of the present invention.

Dynamic Order Routing-financial Applications

Moving away from manufacturing processes, an example follows of how embodiments of the present invention may be applied to a transaction system in order to assist brokers to fulfill their various legal requirements to obtain the best possible deal for their client, from any one of a number of sources offering the required security.

There is a considerable variety of trade execution points, including exchanges (e.g. NYSE, AMEX), regional exchanges (e.g. BSE, PHLX) ECN's (Electronic Communications Networks e.g., Redibook, Instinet, SelectNet) and over the counter (OTC) market makers (Fleet Trading, Knight). Once a trade order has been accepted there is a need to determine the execution destination for that trade order. This process is known in the art as "order routing".

The traditional approach for order routing is to use a pre-defined rule-based system. This approach utilizes attributes from the order (e.g., order size) and the security being traded (e.g., non-listed, listed etc.) to determine a routing destination. The main disadvantage with this approach is that it does not take into consideration many dynamic factors such as volatility and liquidity which change with time and market.

Another approach for order routing is known as "dynamic routing". This approach uses real time data from the possible execution points in order to find the best route of execution for a certain order. The use of dynamic routing can yield significant benefits to a client placing an order.

The term "best execution" is determined largely by the price of the execution and the opportunity for price improvement. However, there are other factors such as speed of execution and likelihood of execution that may be equally important.

It should be emphasized that the term "best execution" is not only an economic goal but also a legal obligation of the brokerage firms. According to the SEC and NASD rules, a member must use reasonable diligence to ascertain the best inter-dealer market for the subject security and buy or sell in such market so that the resultant price to the customer is as favorable as possible under prevailing market conditions. Thus, the quality of execution must always be viewed from the customer's perspective and not that of the firm.

The algorithm of the above-described embodiments can be utilized for solving problems associated with order routing. First, each execution destination is identified and analyzed for measurable inputs that affect parameters that determine the quality of an execution (e.g., price, speed, likelihood, etc.) These measurable inputs can be, for example, liquidity (measured, for example, by the bid/ask imbalance), volatility (measured, for example, by the spread size), current price (relative to the lowest price), order size and time of the day. Once this information is acquired, past data can be utilized to build an execution destination for each stock and to build a predicted distribution of each of the outputs for every set of measurable inputs. In other words, one can create a lookup table for predicting the results of sending an order to a certain destination. This table can be utilized for optimizing a destination for an order. This optimization can be done in two ways as follows:

Feed-Forward—collecting relevant real time data from all possible destinations of a new order, using the lookup table to compare the predicted output and sending the order to the optimal destination according to the results obtained from the lookup table.

Feedback—when an order which is sent to a certain destination produces a result which is significantly worse than expected, the information is assimilated in order to correct 'behavior' for future orders.

Weight Monitoring

Assume a system whose task is to monitor weights and to detect overweight or underweight trends in the population. Our system accepts weight measurements and will identify outstandsing items. For simplicity assume that weights higher than 95 kg. And lower than 55 kg. Are considered outstanding.

Our system will react to a 100 kg. measurement. However. if the relevant person's height is 205 cm. then the alarm will be a false one, since for a very tall person a weight of 100 kg. is normal and healthy. Thus a better monitoring should relate to the weight as function of height and look at weight distributionms per height, or height subinterval. A weight of 70 kg. will pass the system unnoticed, but if the relevant person's age is 5, the the person is definitely overweight. Therefore weights should be treated as functions of two variables; height and age. Similarly we should consider parameters as sex, ethic origin etc. as effecting weight.

Monitoring the weight as a multivariate function will yield a more sensitive monitoring while reducing false alarms.

We may use the present invention to create the relevant weight distributions from data, and rather than monitoring the population by the entire population distribution use the relevant specific vector distributions.

Health Care Applications

Medical databases contain information which is reflective of empirical medical results and as such probably contain information and relationships not known at the present to medical science because to date there has not been the tool to effectively take into account the effects of multiple inputs in a comprehensive and systematic manner.

Artificial Intelligence (AI) can be used to extract knowledge of medical significance from such databases. The algorithm of the present invention can be utilized in data mining techniques to determine a relationship between causes (Input values) and effects (Output value) and to functionally model such relationships. Models generated can be applied to improve medical decision making capabilities.

1) Treatment of Simultaneous Multiple Pathologies

Treatment of a specific pathological disorder in an individual may effect other disorders. The optimal selection of treatment in the case of multiple disorders may be complex, since it depends on many parameters and interrelationships. The algorithm of the present invention can be used to model multiple disorder situations and as such to improve decision-making capabilities. In this connection reference is now made to FIG. 14 which shows how a variety of tests combined with a patient history can be measured and compared with an output in terms of the likelihood of a given pathology. Provided the input sample is sufficiently large, useful information may be obtained concerning predictions of the likelihood of the given pathology, in the same way as useful indications were gathered above in relation to process input-output relationships in silicon wafer manufacture.

Figure 15:
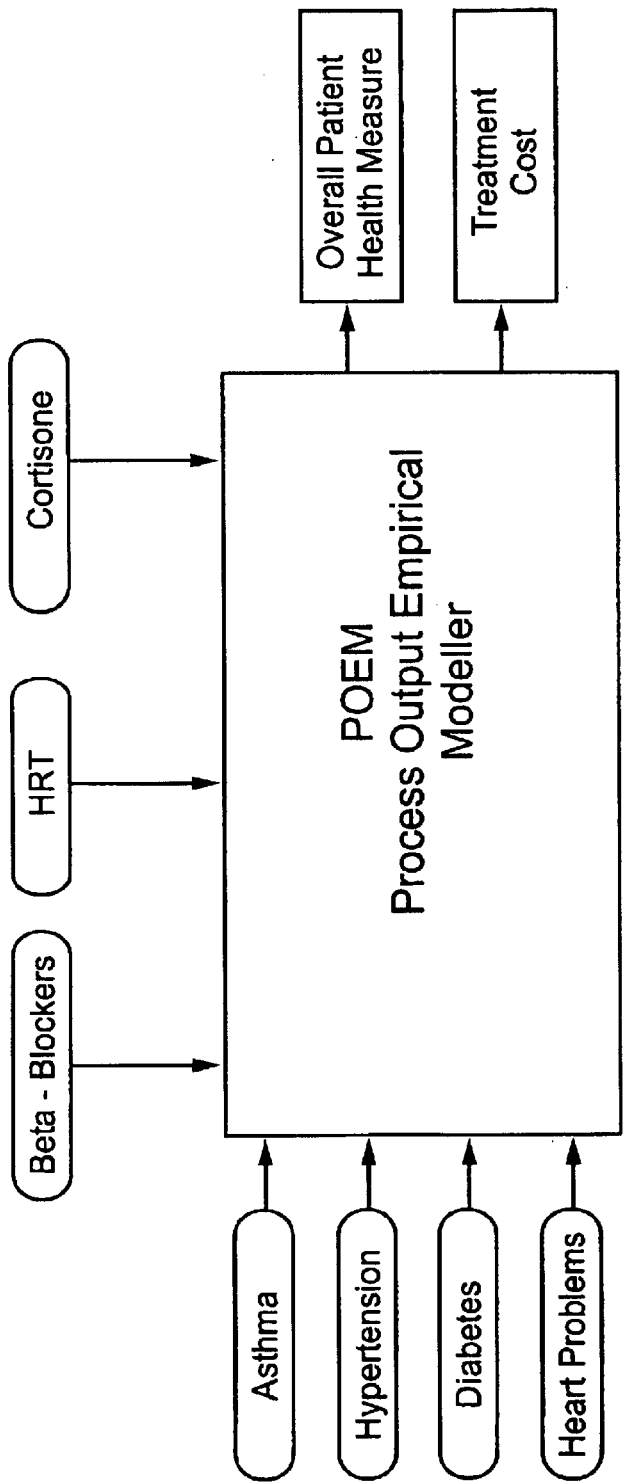
FIG. 15 is an example of a cause and effect medical relationship with seven input variables and two outputs.

Reference is now made to FIG. 15, which is a simplified diagram of a model showing various inputs including diagnosed conditions and applied treatements, being related to a series of outputs. It will be appreciated that in some cases, selection of optimal treatment may be beyond the capabilities of a physician due to the large number of factors, their complexity, the interrelationships therebetween and the minimal time available for decision making. In cases of three or more simultaneous illnesses, decisions will rarely be optimal, resulting in suboptimal patient care and undue expenses resulting from unneeded treatments.

For example, HRT can be utilized to lower the incidence of heart dysfunction, but tends to raise blood sugar and triglyceride levels. Beta-blockers can alleviate hypertension but have deleterious effects on coughing and asthmatic illnesses. In such cases, it is oftentimes difficult for a physician to decide what course of treatment to apply which would result in lowest hospitalization rate, doctors' visits and lowest treatment cost. As shown in FIG. 6, the algorithm of the present invention can successfully map these complex relationships and indicate for a given combination of disorders, the best possible treatment regimen.

2) Analyzing Lab Tests—"If-Then" Rule Learning

Experienced physicians can qualitatively relate selected laboratory tests with a pathological condition and thus indicate the presence or absence of such a condition. The present invention enables to quantitatively relate laboratory tests to pathological conditions by generating a quantitative table (function) from an extensive database containing the lab results and the respective pathology occurrence.

Figure 14:
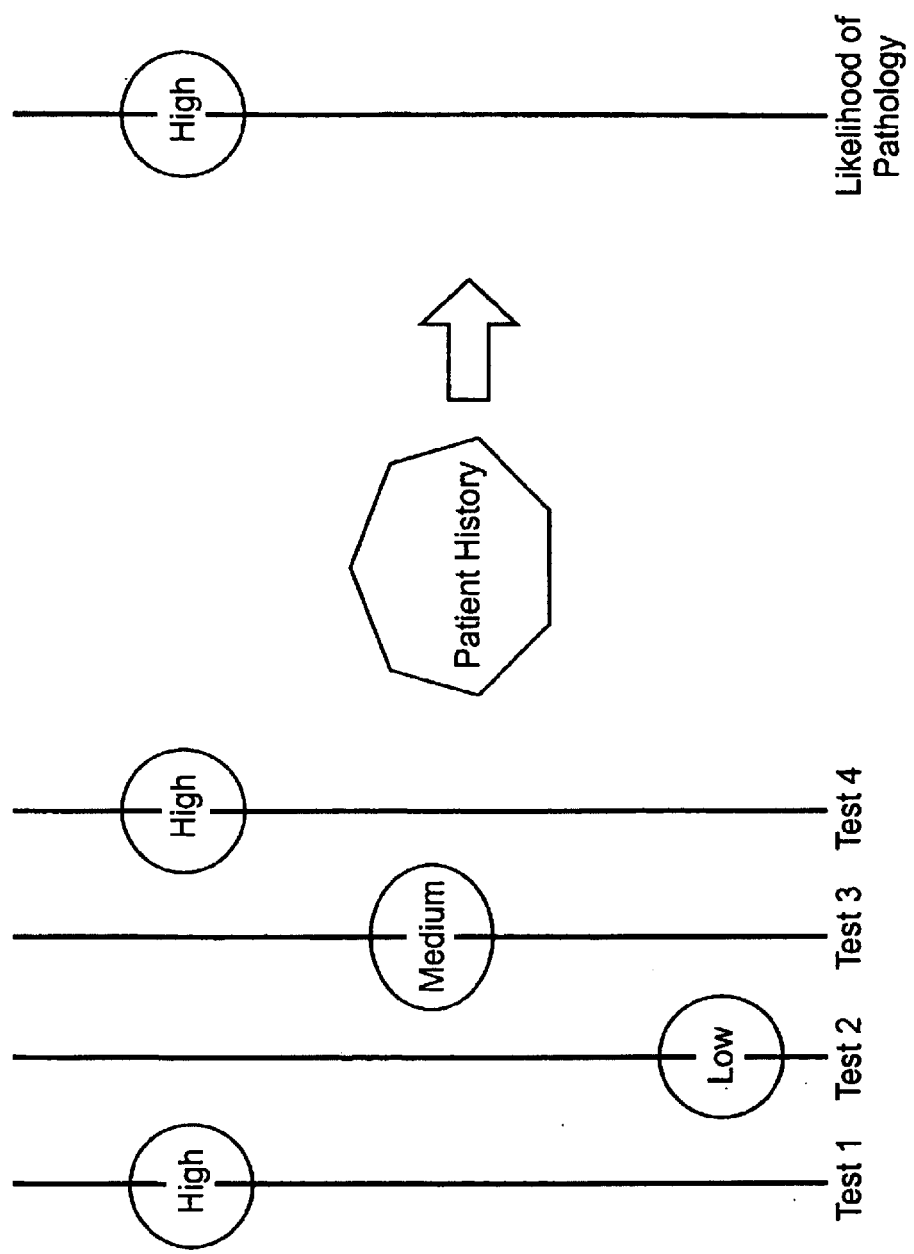
FIG. 14 is a medical example of uncovering the quantitative relationship of the likelihood of a pathology as function of tour tests and the patient's history from historical data.

As shown in FIG. 14, for example, the quantitative table can be used along with a logical set of rules in the following manner: if the result of Blood Test 1 is high and the result of Blood Test 2 is low and the result of Blood Test 3 is medium and the result of Blood Test 4 is high, then, considering the patient records, the likelihood of the pathology is high.

The high/medium/low levels are only examples; one may define additional grades, such as, for example, "very high", "high-medium" etc.

The algorithm of the present invention generates the functional relationship between blood tests (input) and conditions (output) by utilizing actual data and non-parametric statistics during a "learning period" in which collected data or stored data is used to generate and calibrate the function.

3) Individualization of Treatment

Yet another health related application of the present invention relates to individual customization of treatment, drugs, drug doses etc. By accessing patient records and utilizing patient characteristics as the input values and the recorded success of the treatment as the output, the algorithm of the present invention can optimize treatment according to patient parameters.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications cited herein are incorporated by reference in their entirety. Citation or identification of any reference in this application shall not be construed as an admission that such reference is available as prior art to the present invention.

What is claimed is:

1. A method of monitoring a process having a plurality of input parameters, each parameter having respective variation range and taking a value within said respective variation range, and said process having at least one output parameter, the method comprising:

dividing said variation ranges of said input parameters into sub-ranges, obtaining a series of input values for each of said input parameters, said input values respectively falling into respective ones of said sub-ranges, representing each input value by its corresponding sub-range, obtaining a corresponding series of output values for said at least one output parameter, for each one of input states of said system, each input state comprising corresponding values for each of said input parameters, recording an association of a combination of sub-ranges with values of said at least one output parameter corresponding to said input state, from said associations constructing a statistical model relating said sub-ranges of said plurality of input values of said input state with said output values and using said statistical model to predict output behaviour of, said process in terms of said input states.

2. A method according to claim 1, wherein said plurality of input parameters define an input space, wherein said relating said sub-ranges of said plurality of input values with said output values comprises:

building said combinations of subranges as a plurality of tuples, being one sub-range for each input parameter, thereby defining the input range by said tuples, associating measured outputs with a tuple describing corresponding inputs, said tuples thereby defining said inputs states.

3. A method according to claim 2, wherein said constructing a statistical model comprises associating each tuple with a single value being a statistically processed result of respective corresponding values of said output parameter.

4. A method according to claim 2, wherein at least one tuple is associated with a probability of occurrence.

5. A method according to claim 4, wherein any tuple associated with a low probability of occurrence is further associated with an alarm.

6. A method according to claim 2, wherein said states are grouped into steady states of said process and states requiring corrective action to said process.

7. A method according to claim 2, wherein said process is a part of a larger process.

8. A method according to claim 2, wherein said process is at least part of a semiconductor wafer manufacture process.

9. A method according to claim 1, comprising the further steps of identifying the statistical distribution of output values corresponding to at least some of said sub-ranges, modifying at least one of the boundaries of a sub-range, reassigning said input values to said modified sub-ranges in accordance with said modified sub-range boundaries, re-identifying the statistical distribution of output values corresponding to at least some of said sub-ranges, and selecting the subranges giving a better statistical distribution according to a predefined distribution criterion.

10. A method according to claim 9, wherein said steps of modifying, reassigning, re-identifying and selecting are repeated until a predefined finishing criterion is met.

11. A method according to claim 9, wherein said predefined distribution criterion is a low mean square distribution.

12. A method of modeling a relationship between a plurality of input parameters each having an variation range and an output parameter, said relationship having a plurality of possible states, the method comprising:

discretizing said variation ranges into a plurality of sub-range vectors such that there is a plurality of sub-range vectors for each input parameter, building tuples of combinations of said sub-range vectors from respective ones of said input parameters, determining a statistical association between each tuple and values of said output parameter, and using said statistical association to model said relationship.

13. A method according to claim 12, wherein said step of determining a statistical relationship comprises associating said tuple with a single value being a statistically processed result of said corresponding values of said output parameter.

14. A method according to claim 12, comprising the modifying a current set of said sub-range vectors, said modifying comprising the further steps of identifying the statistical distribution of output values corresponding to at least some of said subrange vectors, modifying at least some of the boundaries of subranges used in at least some of said subrange vectors, reassigning respective input values to said sub-range vectors in accordance with said modified sub-range boundaries, recalculating the statistical distribution of output values corresponding to said modified subrange vectors, and selecting the modified set of subrange vectors if the modification gives a better statistical distribution according to a predefined distribution criterion.

15. A method according to claim 14, wherein said steps modifying a current set of subrange vectors is repeated until a predefined finishing criterion is met.

16. A method according to claim 14, wherein said predefined distribution criterion is a low mean square distribution.

17. A method according to claim 12, wherein at least some of said states indicate actions to be taken.

18. A system for monitoring a process having a plurality of input parameters, each parameter taking values within an input variation ranges, at least one output parameter taking values within an output variation range, the system having a plurality of possible operational states each associated with different parts of said output range, the system comprising:

an input value recorder for recording a series of values of said input parameters, an output value recorder for recording a corresponding series of values of said at least one output parameter, a range divider for dividing said variation ranges of said input parameters into sub-range vectors, a tuple builder for building combinations of sub-range vectors from respective ones of said input parameters, a first associator for associating each tuple with statistically corresponding values of said at least one output parameter, and a second associator for associating each tuple with one of said possible operational states of said process, thereby to monitor said process in terms of said states.

19. A system according to claim 18, further comprising a statistical analyzer, associated with said first associator, for producing a single value being a statistically processed result of said corresponding values of said at least one output parameter.

20. A system according to claim 18, further comprising an intelligent decision maker operable to use said tuples to provide numerical values for nodes in a decision tree of said process, and to make decisions based on desired outputs and on said values.

21. A system according to claim 18, further comprising a vector annealer for annealing sets of said sub-range vectors based on the statistical range of said associated corresponding values of a corresponding input parameter.

22. A system according to claim 21, operable to distinguish between inputs which are effective in governing said process and inputs which are ineffective.

23. A system according to claim 18, wherein said states are indications of a quality level of said process.

24. A system according to claim 18, wherein at least one of said states is indicative of corrective action to be taken in said process.

25. A system according to claim 18, wherein said process is a part of a larger process.

26. A system according to claim 18, wherein said process is at least a part of a semiconductor wafer manufacturing process.

* * * * *